(12) United States Patent
Anelli et al.

(10) Patent No.: US 9,851,027 B2
(45) Date of Patent: Dec. 26, 2017

(54) SUBMARINE FLEXIBLE PIPE

(71) Applicant: PRYSMIAN S.P.A., Milan (IT)

(72) Inventors: Pietro Anelli, Milan (IT); Rodolfo Sica, Milan (IT); Gabriele Perego, Milan (IT); Carlos Alberto Ferreira Godinho, Milan (IT)

(73) Assignee: PRYSMIAN S.P.A, Milan (IT)

( * ) Notice: Subject to any disclaimer, the term of this patent is extended or adjusted under 35 U.S.C. 154(b) by 53 days.

(21) Appl. No.: 14/903,838

(22) PCT Filed: Jul. 8, 2014

(86) PCT No.: PCT/IB2014/062939
§ 371 (c)(1),
(2) Date: Jan. 8, 2016

(87) PCT Pub. No.: WO2015/004597
PCT Pub. Date: Jan. 15, 2015

(65) Prior Publication Data
US 2016/0146380 A1    May 26, 2016

(30) Foreign Application Priority Data

Jul. 10, 2013 (IT) .................................. MI13A1165

(51) Int. Cl.
*F16L 11/08* (2006.01)
(52) U.S. Cl.
CPC ............. *F16L 11/08* (2013.01); *F16L 11/083* (2013.01)
(58) Field of Classification Search
CPC ................................. F16L 11/16; F16L 11/083
(Continued)

(56) References Cited

U.S. PATENT DOCUMENTS 3,118,223 A    1/1964  Schüll et al.
3,878,871 A *  4/1975  Anthony ............... B32B 15/016
                                              138/140
(Continued)

FOREIGN PATENT DOCUMENTS

GB        2 163 513        2/1986
WO    WO 2008/119676     10/2008

OTHER PUBLICATIONS

International Search Report from the European Patent Office for International Application No. PCT/IB2014/062939, dated Oct. 7, 2014.
(Continued)

*Primary Examiner* — Patrick F Brinson
(74) *Attorney, Agent, or Firm* — Finnegan, Henderson, Farabow, Garrett & Dunner, L.L.P.

(57) ABSTRACT

Submarine flexible pipe includes a metal flexible carcass, an inner polymeric liner arranged in a radially outer position with respect to the metal flexible carcass, a protective polymeric outer sheath and a mechanical armor structure arranged in a radially inner position with respect to the protective polymeric outer sheath, the mechanical armor structure being potentially exposed to water contact. The mechanical armor structure includes a pressure resistant armor and a tensile armor arranged in a radially outer position with respect to the inner polymeric liner. The mechanical armor structure includes a plurality of carbon steel elongated elements, each of the carbon steel elongated elements being coated by an aluminum cladding.

15 Claims, 3 Drawing Sheets

(58) Field of Classification Search
USPC .......................... 138/134, 135, 137, 138, 140
See application file for complete search history.

(56) References Cited

U.S. PATENT DOCUMENTS

| | | | |
|---|---|---|---|
| 4,402,346 A * | 9/1983 | Cheetham ............. | F16L 11/083 138/103 |
| 4,773,151 A | 9/1988 | Griffiths et al. | |
| 5,275,209 A * | 1/1994 | Sugier .................... | F16L 11/16 138/129 |
| 2004/0261878 A1* | 12/2004 | Jung ....................... | F16L 11/16 138/135 |
| 2005/0089637 A1 | 4/2005 | Dupoiron et al. | |
| 2013/0037160 A1 | 2/2013 | Ishii et al. | |

OTHER PUBLICATIONS

Written Opinion of the International Searching Authority from the European Patent Office for International Application No. PCT/IB2014/062939, dated Oct. 7, 2014.

* cited by examiner

SUBMARINE FLEXIBLE PIPE

CROSS REFERENCE TO RELATED APPLICATIONS

This application is a national phase application based on PCT/IB2014/062939, filed Jul. 8, 2014, and claims the priority of Italian Patent Application No. MI2013A001165, filed Jul. 10, 2013, the content of both applications being incorporated herein by reference.

BACKGROUND OF THE INVENTION

Field of the Invention

The present invention relates to a submarine flexible pipe.

Description of the Related Art

Submarine oil extraction requires the use of flexible pipes for transporting crude oil, along with other substances or gases mixed thereto, from the submarine extraction well to the sea level. Such pipes must be able to withstand for a very long time (at least 20 years) to high internal and/or external pressures (even higher than 1000 bar) and to high temperatures (even up to 130° C.) as well as to high temperature fluctuations correlated to the very high depth below the sea level (even higher than 1000 m). These flexible pipes must also be able to withstand to the continuous bending stresses caused by the marine streams and surface weaves.

In order to cope with the above requirements, submarine flexible pipes provided with a flexible steel structure are widely used. These flexible pipes typically comprise a flexible internal stainless steel carcass, an internal polymeric sheath surrounding the carcass aimed at ensuring the fluid tightness, a helical metal reinforcement layer (pressure armor layer), wound with a short pitch, surrounding the polymeric sheath and adapted to withstand to the internal and/or external pressure, tensile armor layers surrounding the pressure armor layer and adapted to withstand to the longitudinal tensile forces and an external protective polymeric sheath. The tensile armor layers are typically made of carbon steel wires or strips helically wound with a long pitch in opposite directions, possibly separated by polymeric layers.

WO 2008119676 discloses a flexible pipe suitable for transporting crude oil, including hydrocarbons liquid and gases, such as natural gas, in deep offshore oil exploration of depths up to 3000 m. The flexible pipe comprises, from the inside to the outside, a flexible metal tube or carcass, an internal sealing sheath or pressure sheath placed around the carcass, a covering plastic layer between the carcass and the pressure sheath, a pressure vault intended to take up the internal compressive forces, two tensile armor plies intended to take up the longitudinal tensile forces and a protective sheath. The tensile armor plies are formed of metal wires or strips wound with a long pitch.

During the whole working time of the flexible pipe, some gases mixed with the crude oil, mainly methane, carbon dioxide, hydrogen sulfide and water, slowly diffuse through the internal polymeric sheath and reach the tensile armor layers. Carbon dioxide, hydrogen sulfide and water can give rise over the time to corrosion phenomena of the carbon steel and, in particular when a high resistance carbon steel (e.g. Rockwell Hardness Cone>20 kg/mm$^2$) is employed, can give rise to an undesired steel embrittlement, which considerably limits the working life of the flexible pipe.

The Applicant observed that a flexible pipe as disclosed in WO 2008119676 is subjected to the above-discussed corrosion phenomena, which considerably limits the pipe working life.

U.S. Pat. No. 4,773,151 discloses a flexible hose suitable for the transportation of crude oil containing hydrogen sulfide. The hose comprises a body of elastomeric material having embedded therein two wire reinforcement layers. Each reinforcement layer comprises twenty cords each of an assembly of seven wire filaments, said cords being arranged to extend helically relative to the direction of the length of the hose. Each wire filament has a steel core surrounded by a coating of aluminum for the purpose of providing the steel with improved corrosion resistance to the hydrogen sulfide.

The Applicant observed that the aluminum coated steel wires disclosed in U.S. Pat. No. 4,773,151 are fully insulated, being embedded in an elastomeric material.

However, the steel armors in a submarine flexible pipe are not insulated, being located in a position where the contact with the seawater has to be contemplated.

As a matter of fact, the location of the steel armors under the external sheath is a place exposed to seawater contact, for example because of damages occurring to the external sheath during the flexible pipe operating life and possible condensation of the seawater, with the result of corrosive problems due to the potential presence of water, carbon dioxide and hydrogen sulfide.

This is accounted, for example, in the Conference Paper "Qualification of Steel Wire for Flexible Pipes" by Adam Rubin and Jonas Gudme, NKT Flexibles, published by NACE International in CORROSION 2006, Mar. 12-16, 2006, San Diego Calif.

In particular, such paper refers to the space between the inner liner and the outer sheath, referred to as the "annulus". This annular space is primarily occupied with carbon steel from the armoring wires.

Such paper also defines that the free volume in the annulus between the steel wires is very limited resulting in a very high ratio of steel surface to free volume.

In order to determine the life of flexible pipes, prediction of the annulus environment is of great importance. In principle the annulus environment is determined by the following factors:

Transportation of gas in and out of the annulus through the polymer liners;
Presence of water in annulus and possible condensation;
Corrosion reaction;
Venting valve opening pressure.

It is indeed well known that the presence of dissolved oxygen and chloride ions reduces the resistance of aluminum to corrosion in water. It is thus not recommendable using aluminum in those applications where it is exposed to a potential contact with the seawater.

This is confirmed by several publications. For example, "The long Island Sound Submarine cable Interconnection Operating Experience" of M. Chamberlin and S. W. Margolin, 7th IEEEPES conference, Apr. 1-6, 1979, Book CH1139-759, pages 290-298, discloses the operating experience of a submarine fluid oil cable for energy transport. The cable comprises an oil duct, a copper conductor, a carbon-black screen, a paper insulation, a lead-alloy sheet, a polyethylene sheath and an aluminum alloy wire armor layer. A 19 km length of 138 KV ac cable was installed at the Long Island Sound. This cable showed corrosion problems, in part due to an incorrect cathodic protection design, in part due to free and galvanic corrosion phenomena caused by the high presence of oxygen in the seawater, even at the sea bottom. This experience has shown the importance of providing physical protection to the cables at any depth in seawater and to be especially cautious in the analysis and design of the cathodic protection system. In its eight years of operation, the cable has experienced 11 incidents of physical damage and/or sheath corrosion. The events of these eight years of operation lead to several judgmental conclusions, applicable to future installations, with similar water and bottom conditions, one of these judgmental conclusions being that the use of an aluminum alloy armor in seawater is not recommended. The submarine cable field is closely related to the flexible pipes field for these aspects, as similar problems are faced by both technologies.

SUMMARY OF THE INVENTION

The Applicant considered the problem of avoiding, or at least considerably reducing, the hydrogen sulfide corrosion phenomena in a submarine flexible pipe provided with tensile armor layers made of non-insulated carbon steel wires or strips.

Within the present description, the term "carbon steel" is used in reference to steel which is not stainless steel, and may include alloy steels. Such carbon steel is selected because of its mechanical properties and is not expected to provide a significant corrosion resistance.

The Applicant found that the hydrogen sulfide corrosion phenomena can be effectively avoided, or at least considerably reduced, by providing the steel wires or strips of the tensile armor layers with an aluminum cladding. Indeed, the aluminum is chemically inert versus the hydrogen sulfide.

However, the Applicant observed that the tensile armor layers of submarine flexible pipes are arranged in a position exposed to potential contact with the seawater. Indeed, should a breakage of the external protective polymeric layer occur for any reasons during installation and/or the working life of the pipe, the seawater can easily enter into the pipe and reach the void areas of the "annulus" (as above defined).

The Applicant thus realized that a submarine flexible pipe having armor layers made of carbon steel wires or strips coated with aluminum cladding would in principle be subjected to the corrosion action of the seawater.

However, in spite of any contrary expectation, the Applicant surprisingly found that the use of aluminum clad armors in submarine flexible pipes not only resulted in suitable resistance to hydrogen sulphide corrosion, but also provide a suitable resistance to the chloride ion enhanced corrosion associated with the action of the seawater.

Accordingly, the present invention relates to a submarine flexible pipe for oil transportation, comprising:
a metal flexible carcass;
an inner polymeric liner arranged in a radially outer position with respect to said metal flexible carcass;
a protective polymeric outer sheath;
a mechanical armor structure in a radially inner position with respect to said protective polymeric outer sheath, said mechanical armor structure being potentially exposed to water contact, said mechanical armor structure including a pressure resistant armor and a tensile armor, arranged in a radially outer position with respect to said inner polymeric liner;
wherein said mechanical armor structure comprises a plurality of carbon steel elongated elements, each of said carbon steel elongated elements being coated by an aluminum cladding.

Throughout the present description and in the subsequent claims, the expressions "radially inner" and "radially outer" are used to indicate a closer and far position, respectively, along a radial direction with respect to a longitudinal axis of the flexible pipe.

Throughout the present description and in the subsequent claims, the expression "elongated elements" is used to encompass wires or strips or tapes having, if not further specified, any cross-sectional shape.

Preferably, said mechanical armor structure comprises at least two overlapping tensile armor layers.

Preferably, the carbon steel elongated elements of said overlapping armor layers are arranged according to long-pitch helical windings. More preferably, said at least two overlapping armor layers have opposite winding directions with respect to a longitudinal axis of the submarine flexible pipe, that is the helically wound carbon steel elongated elements are counter wound in pairs.

By long-pitch we mean a helix pitch which is at least five times the diameter of the circumference around which the helix is designed, so as to provide a significant component of the load borne by the elongated elements aligned along the helix axis.

Preferably, a first layer of plastic material is interposed between said at least two overlapping tensile armor layers.

Preferably, a second layer of plastic material is interposed between a radially inner layer of said at least two overlapping tensile armor layers and said pressure resistant armor.

Preferably, said aluminum cladding has a thickness not lower than about 250 μm.

More preferably, said aluminum cladding has a thickness of between about 250-900 μm.

Said aluminum cladding is preferably applied by any of the following processes: immersion in melted aluminum, coating with aluminum thin foil, flame and/or plasma spraying, aluminum extrusion. More preferably, said aluminum cladding is applied by an extrusion process.

Preferably, said metal flexible carcass comprises a helical winding of a stainless steel interlocked elongated element.

Preferably, said inner polymeric liner is made of polyamide or polyvinylidene fluoride.

Preferably, said pressure resistant armor comprises a helical winding of an interlocked carbon steel elongated element.

Preferably, said protective polymeric outer sheath is made of polyethylene or polyamide.

BRIEF DESCRIPTION OF THE DRAWINGS

Further features and advantages of the present invention will appear more clearly from the following detailed description of a preferred embodiment thereof, such description being provided merely by way of non-limiting example and being made with reference to the annexed drawings. In such drawings.

DESCRIPTION OF THE INVENTION

Figure 1:
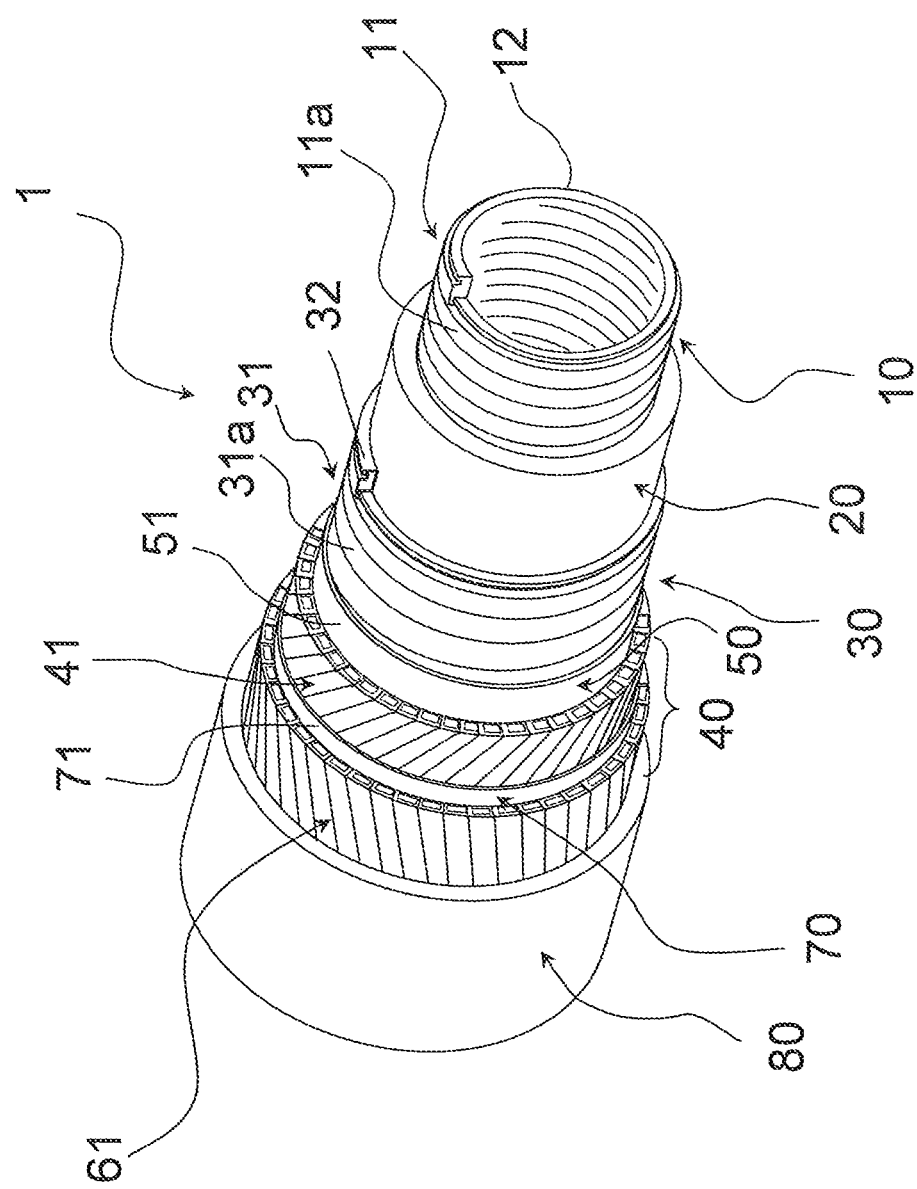
FIG. 1 is a schematic perspective view of a submarine flexible pipe according to the invention.
Figure 2:
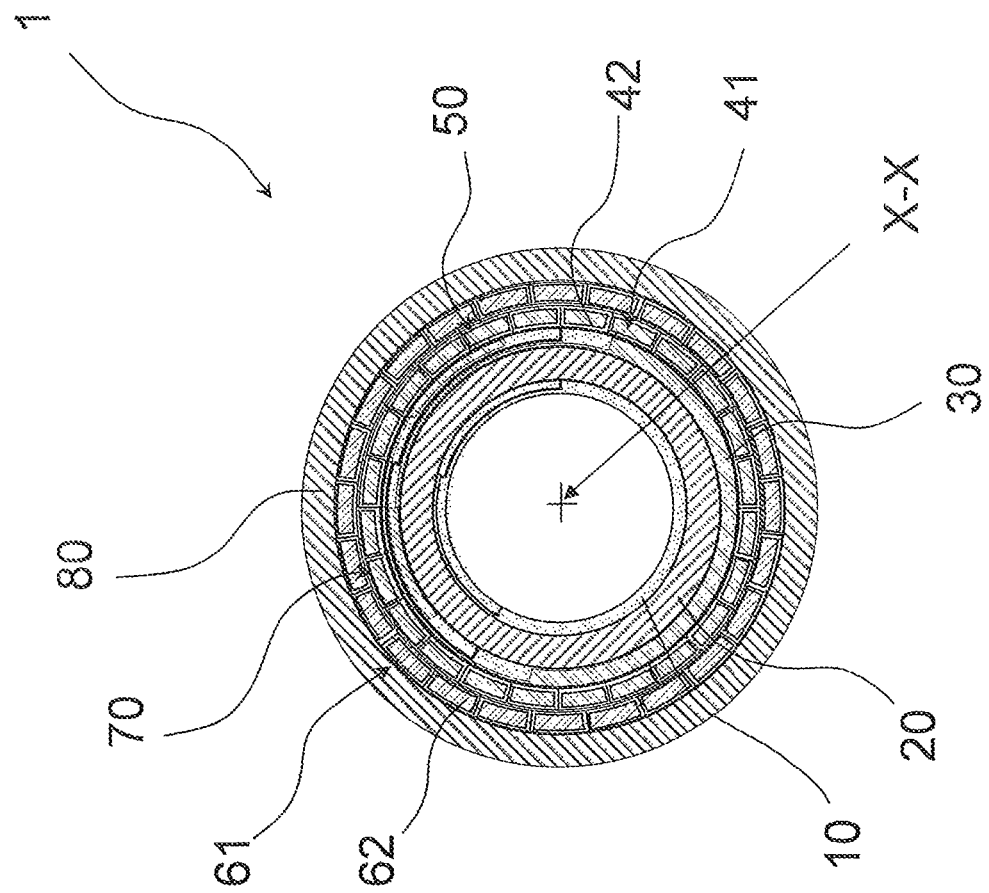
FIG. 2 is a cross-sectional view of the submarine flexible pipe of FIG. 1.
Figure 3:
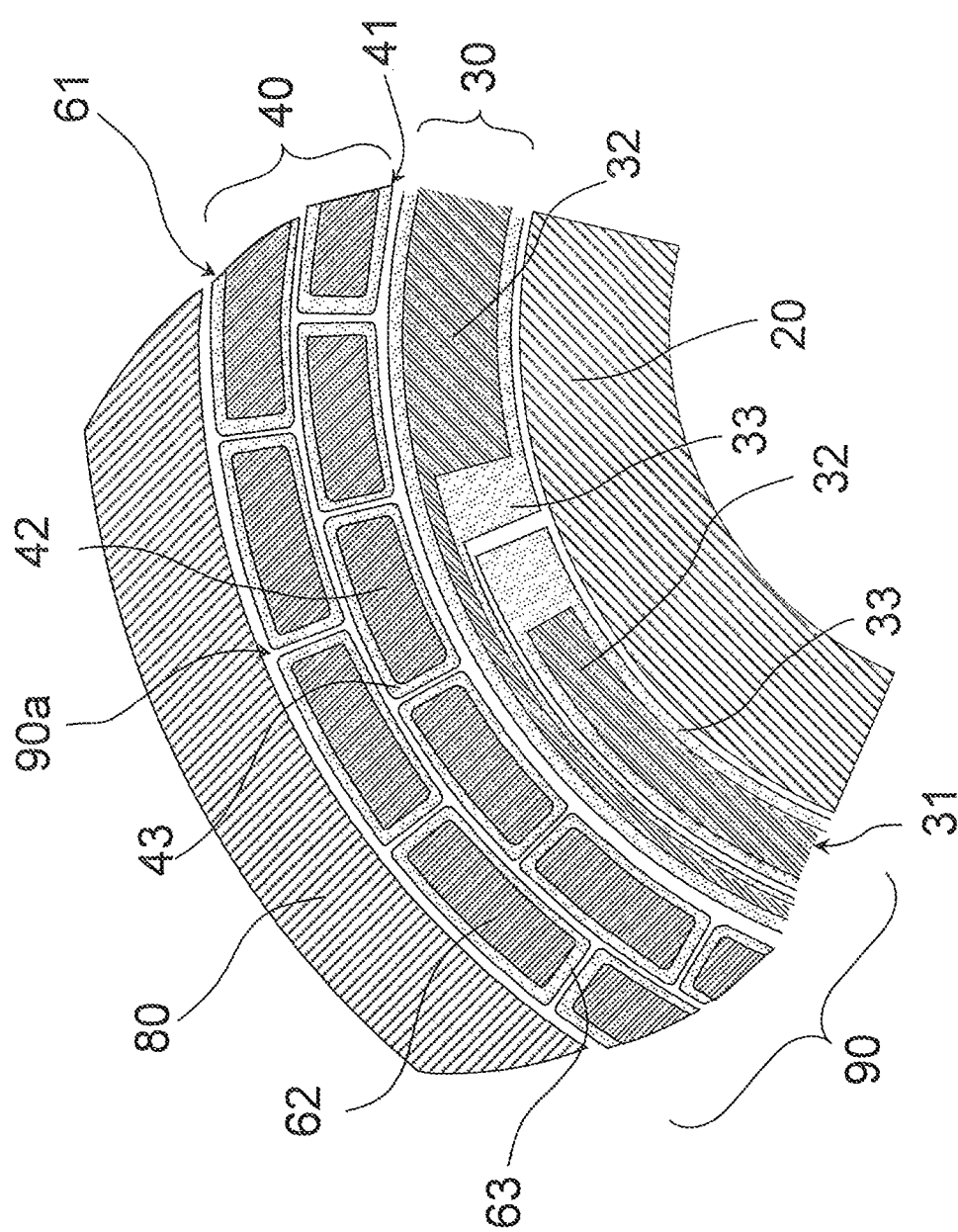
FIG. 3 is an enlarged view of a portion of the cross-sectional view of FIG. 2.

In FIGS. 1-3, a submarine flexible pipe according to the present invention is labeled with numeral reference 1.

The pipe 1 extends along a longitudinal axis X-X.

The pipe 1 comprises, in a radially inner position thereof, a metal flexible carcass 10, configured to operate in contact with the crude oil (or other fluid) to be transported.

The carcass 10 comprises a helical winding 11 of a stainless steel elongated element 12.

The pipe 1 further comprises, in a radially outer position with respect to the carcass 10, an inner polymeric liner 20. The inner polymeric liner 20 is an extruded layer configured to provide fluid integrity at the radially outer surface of the carcass 10, in order to prevent leakages of the crude oil out of the carcass 10.

The polymeric material of the liner 20 is preferably selected from the group comprising: polyamide, polyvinylidene fluoride, polyethylene, cross-linked polyethylene.

More preferably, this polymeric material is polyamide (for example polyamide 6 or polyamide 12) or polyvinylidene fluoride.

A covering layer of polymeric material (not shown) may be provided between the carcass 10 and the polymeric liner 20.

The polymeric material of this covering layer is preferably polyamide or polypropylene.

The pipe 1 further comprises, in a radially outer position with respect to the inner polymeric liner 20, a mechanical armor structure which is potentially exposed to water contact. The mechanical armor structure comprises a pressure resistant armor 30 and a tensile armor 40.

The pressure resistant armor 30 is configured to withstand to radial loads, such as the internal pressure which the carcass 10 is subjected to in operation. The pressure resistant armor 30 is formed from one or more structural layers consisting of a short-pitch helical winding 31 of an interlocked profiled carbon steel elongated element 32.

In the present description, the coating of armors is defined as "aluminum". However, this definition encompasses aluminum alloys such as those belonging to 1000, 3000, 5000, 6000 and 7000 International Alloy Designation System series, preferably 1100, 6061, 7079.

The helical winding 31 is defined by a plurality of coils 31a arranged coaxially to the longitudinal axis X-X and preferably interlocked with each other.

As shown in FIG. 3, the interlocked profiled carbon steel elongated element 32 is coated by an aluminum cladding 33.

In the present example, the pressure resistant armor 30 comprises a single layer of coils. However, more pressure resistant armor layers can be provided, according to the specific needs.

As shown in FIG. 1, the tensile armor 40 is arranged in a radially outer position with respect to the pressure resistant armor 30. The tensile armor 40 is configured to withstand to the longitudinal tensile forces which the pipe 1 may be subjected to in operation.

The tensile armor 40 comprises a first tensile armor layer 41 of long-pitch helical windings of carbon steel elongated elements 42 (FIG. 3) extending parallel to each other in a helix coaxial with the longitudinal axis X-X.

As shown in FIG. 3, each elongated element 42 is coated by an aluminum cladding 43.

In the preferred embodiment shown in the attached drawings, a layer 50 of plastic material is arranged between the pressure resistant armor 30 and the tensile armor 40. The layer 50 is preferably made of a helical winding of a tape 51 of a polymeric material and it is used to avoid in operation any undesired wear at the interface between the pressure resistant armor 30 and the tensile armor 40.

The polymeric material of the layer 50 is preferably polyamide (for example polyamide 6) or polypropylene.

The tensile armor 40 comprises, in a radially outer position with respect to the layer 50, a second tensile armor layer 61 of long-pitch helical windings of carbon steel elongated elements 62 (FIG. 3) extending parallel to each other in a helix coaxial with the longitudinal axis X-X.

As clearly shown in FIG. 3, each elongated element 62 is coated by an aluminum cladding 63.

The helical windings of the second tensile armor layer 61 extend along a winding direction which is opposite to the winding direction of the helical windings of the first tensile armor layer 41 with respect to the longitudinal axis X-X, so as to define a crossed configuration. Preferably, the helical windings of the first and second tensile armor layers 41 and 61 are lad with substantially the same pitch, in opposite directions, so as to prevent pipe rotations under axial load.

Typically, for a flexible pipe of about 2÷16 in (about 50÷400 mm) internal nominal diameter, the winding pitch of the tensile armor layers 41 and 61 is comprised between 25 cm and 200 cm.

In the preferred embodiment shown in the attached drawings, a layer 70 of polymeric material is arranged between the first tensile armor layer 41 and the second tensile armor layer 61. The layer 70 is preferably made of a helical winding of a tape 71 of a polymeric material and it is configured to avoid in operation any undesired wear at the interface between the tensile armor layers 41 and 61.

The polymeric material of the layer 70 is preferably polyamide (for example polyamide 6) or polypropylene.

The pipe 1 further comprises, in a radially outer position with respect to the radially outer tensile armor layer 61, a protective polymeric outer sheath 80. The outer sheath 80 is aimed to be waterproof, even if in practice water presence under the outer sheath 80 must be taken into account for evaluating corrosion risks.

The polymeric material of the sheath 80 is preferably polyethylene or polyamide (for example polyamide 11).

In addition to the main structural layers and anti-wear layers described above, other layers may be included, depending on specific needs. Isolation tapes with low thermal conductivity (not shown) can also be applied between for example the tensile armor 40 and the outer sheath 80, in order to obtain specific thermal insulation properties of the pipe 1.

As shown in FIG. 3, where the layers 50, 70 have been voluntarily omitted just for the sake of simplicity, an annulus 90 is defined as the annular space between the inner liner 20 and the outer sheath 80.

This annular space is primarily occupied by the elongated elements 32 of the pressure resistant armor 30 and by the elongated elements 42, 62 of the tensile armor layers 41 and 61, but void areas 90a are inevitably present between each elongated element 42, 62 and the adjacent elongated element 42, 62 as well as between the sheath 80 and the radially outer tensile armor layer 61, between the radially outer tensile armor layer 61 and the radially inner tensile armor layer 41, between the radially inner tensile armor layer 41 and the pressure resistant armor 30, between the pressure resistant armor 30 and the liner 20 and, finally, between each of the above elements and the additional layers 50, 70 if present.

Preferably, each elongated element 42, 62 of the tensile armor 40 has a substantially rectangular cross section of about 7 mm×2 mm for a 3 in pipe, with beveled or rounded edges. The radius of curvature of the rounded edges is preferably of 1.3 mm.

The elongated element 31 of the pressure resistant armor 30 has an interlocking profile of about 16 mm×6.5 mm overall cross section.

Each aluminum cladding 33, 43, 63 of each of the elongated elements 32, 42, 62 has preferably a thickness not lower than about 250 μm. More preferably, said aluminum cladding 33, 43, 63 has a thickness of between about 250-900 μm. The Applicant has found that such a thickness allows to have an expected pipe working life greater than 20 years, up to 40 years.

Each aluminum cladding 33, 43, 63 is applied to the respective elongated element 32, 42, 62 by any of the following processes: immersion of the elongated elements 32, 42, 62 in melted aluminum, coating of the elongated elements 32, 42, 62 with an aluminum thin foil, flame and/or plasma spraying of aluminum on the elongated elements 32, 42, 62, aluminum extrusion onto the elongated elements 32, 42, 62.

Preferably, the aluminum cladding 33, 43, 63 is applied by an extrusion process.

In operation, after installation of the flexible pipe 1, the crude oil is fed within the carcass 10.

The aluminum claddings 33, 43, 63 advantageously protect the carbon steel elongated elements 32, 42, 62 against the corrosion phenomena caused by the diffusion of carbon dioxide, hydrogen sulfide and water from the crude oil up to the pressure resistant armor 30 and tensile armor 40, thus avoiding the risk to have a steel embrittlement resulting from the chemical reaction of the carbon dioxide, hydrogen sulfide and water accumulated in the free spaces 90a of the annulus 90 with the steel of the aforementioned armors. Moreover, should the sheath 80 be damaged for any reasons in operation, the seawater can enter inside the pipe 1 and reach the annulus 90, thus contacting the aluminum claddings 33, 43, 63.

However, it has been found that the expected corrosion of the aluminum claddings 33, 43, 63 does not substantially occur.

TESTS

Specimens of carbon steel were subjected to a first ageing test act according to NACE TM-0177-05, Method B (Standard Bent-Beam Test) specifications. This test is indeed required to be made on any steel-based material intended to be used in the water sea.

The water solution of the ageing test comprises sodium chloride at 5% by weight.

The tested specimens were: one uncoated carbon steel bar, two uncoated carbon steel wires and three aluminum coated carbon steel wires as specified in table 1 below.

The thickness of the aluminum cladding was 270 μm.

TABLE 1

| Specimens description | Specimens dimensions | Material |
|---|---|---|
| Bar | 150 × 7 × 2 mm | Carbon steel |
| Wire | 150 × Ø 4 mm | Carbon steel |
| Wire | 150 × Ø 4 mm | Carbon steel coated with Al |

The tests were made under the following conditions:

Preloading of the specimens by deflection method, with comparator

Test solution: A of EFC 16 (European Federation of Corrosion)

pH solution: 4.0

Gas test: 10% $H_2S$ + 90% $CO_2$

Stress level: 90% of AYS (average yield stress)

Visual exam on every specimen, after corrosion test

The opposite ends of the aluminum coated carbon steel wires were protected with epoxy paint.

The specimens were preloaded according to the NACE specifications and submerged in test solutions at saturation phase. Specifically, the three uncoated specimens were submerged in a first test solution and the three aluminum coated specimens were submerged in a second test solution.

After just 43 hours of ageing, the two uncoated steel wires in the first solution were already broken. Failure of the uncoated steel bar in the first solution occurred after 400 hours, but before the end of the ageing test (720 hours).

At the end of the ageing test the first solution was dirty, as a result of the corrosion of the uncoated specimens.

Differently, the three aluminum coated specimens in the second test solution at the end of the ageing test were not broken and the second solution was clear, as a result of the protective action exerted by the aluminum.

In TABLE 2 below the ageing test details and results are listed.

TABLE 2

Sulphide Stress Corrosion Cracking Test (SSCC)
NACE TM-0177 Method B (Four Point Bending Specimen)

| Specimens | AYS (MPa) | Applied Stress (90% of AYS) | Initial pH | pH in saturated condition | Initial $H_2S$ conc. (ppm) | Final pH | Final $H_2S$ conc. (ppm) | Visual exam at 10X after the corrosion test |
|---|---|---|---|---|---|---|---|---|
| Bar (1426-12 A01) | 1044 | 940 Mpa Deflection: 4,817 mm | 4.0 | 4.02 | 230 | 4.51 | 235 | Failure before 720 hours. *(Note 1) |
| Wire (1426-12 B01) | 1140 | 1026 Mpa Deflection: | | | | | | Failure after 43 hours. *(Note 2) |
| Wire (1426-12 B02) | 1140 | 2,963 mm | | | | | | |
| Coated wire (1426-12 C01) | 1140 | 1026 Mpa Deflection: 2,630 mm | 4.0 | 4.06 | 405 | | 380 | No failure and no cracks at 720 hours. |

TABLE 2-continued

Sulphide Stress Corrosion Cracking Test (SSCC)
NACE TM-0177 Method B (Four Point Bending Specimen)

| Specimens | AYS (MPa) | Applied Stress (90% of AYS) | Initial pH | pH in saturated condition | Initial H$_2$S conc. (ppm) | Final pH | Final H$_2$S conc. (ppm) | Visual exam at 10X after the corrosion test |
|---|---|---|---|---|---|---|---|---|
| Coated wire (1426-12 C02) | 1140 | | | | | | | Formation of a white deposit on wires surfaces. |
| Coated wire (1426-12 C03) | 1140[1] | | | | | | | |

*(Note 1) - Unit the test solution was transparent enough to allow to see specimens, this bar didn't show any cracks. Therefore it didn't break before 400 hours.
*(Note 2) - These specimens were found failed at 7.00 a.m., after 43 hours; their actual failure time is between 30 and 43 hours.

Specimens of uncoated carbon steel bars were compared with aluminum coated carbon steel bars subjected to a second ageing test act according to NACE TM-0177-05, Method B (Standard Bent-Beam Test) specifications.

The aluminum coated carbon steel bars were subjected with the adding of some defects. In particular, two specimens were handled without defects, two specimens with five micro holes at the maximum stress point of the surface of each specimen and two further specimens with the removing, for a length of 13 mm, of the aluminum cladding at the maximum stress point of the surface of each specimen. The thickness of the aluminum cladding was 186 μm.

The specimens of uncoated carbon steel bars were pre-loaded according to the NACE specifications above and submerged in test solutions at saturation phase. Specifically, the two uncoated specimens were submerged in a first test solution and the six aluminum coated specimens were submerged in a second test solution.

Failure of the uncoated steel bars in the first solution occurred after 400 hours, but before the end of the ageing test (720 hours).

At the end of the ageing test the first solution was dirty, as a result of the corrosion of the uncoated specimens.

In table 3 below the ageing test details and results on the uncoated specimens are listed.

TABLE 3

UNCOATED CARBON STEEL CORROSION

| Sample type | Weight before test | Weight after test | Weight change | Thickness loss |
|---|---|---|---|---|
| Bar (651-13 A) | 11.9272 g | 11.4222 g | 0.505 g | 30 μm |
| Bar (651-13 B) | 11.9980 g | 11.4773 g | 0.520 g | 31 μm |

The six aluminum coated specimens in the second test solution at the end of the ageing test were not broken and the second solution was clear, as a result of the protective action exerted by the aluminum in spite of the defects added.

In TABLE 4 the ageing test details and results on the coated specimens are listed.

TABLE 4

COATED CARBON STEEL CORROSION

| Sample type | Weight before test | Weight after test | Weight change | Thickness loss |
|---|---|---|---|---|
| Sound (651-13 F) | 13.0140 g | 12.9749 g | 0.0391 g | 6.7 μm |
| Sound (651-13 G) | 13.0416 g | 12.9873 g | 0.0534 g | 9.31 μm |
| Sound (651-13 H) | 12.9166 g | 12.8310 g | 0.0856 g | 14.70 μm |
| Sound (651-13 I) | 12.9858 g | 12.9370 g | 0.0488 g | 8.38 μm |
| Sound (651-13 L) | 13.0043 g | 12.9282 g | 0.076 g | 13.82 μm |
| Sound (651-13 M) | 12.9111 g | 12.8355 g | 0.0756 g | 13.72 μm |

The ageing tests discussed above highlight that the specimens without aluminum cladding were not in compliance with the NACE TM-0177-05, Method B specifications, while the specimens with aluminum cladding were compliant with the same test.

In particular, the ageing tests conducted by the Applicant show an expected life increase, by comparing the same type of specimens, higher than 16 time due to the provision of an aluminum cladding. This means a very significant working life increase of the flexible pipe 1 of the invention.

The ageing tests confirmed that, in a submarine flexible pipe 1 according to the present invention, there will be no corrosion of the carbon steel elongated elements 32, 42, 62 caused by the diffusion of the hydrogen sulfide inside the pipe 1 and, surprisingly, there will be neither corrosion of the aluminum claddings 33, 43, 63 caused by potential contact with the seawater.

A third ageing test was set up to evaluate the resistance of the aluminum clad steel elements to seawater corrosion (independently from the presence of aggressive carbon dioxide and hydrogen sulfide). In the test two identical plastic pipes, 3 m long and a 12 mm internal diameter, were submerged vertically in sea with their lower ends at 10 m depth. The lower ends of the pipes were closed with stoppers. In each pipe were placed nine samples of 2.7 mm of aluminum coated steel wire each of them 300 mm long with the ends sealed with resin. The cladding of the wire was about 190 micron thick. Each sample was initially cleaned with acetone, marked with a progressive reference and precision weighed. Said wire samples were arranged vertically one on top of the other and maintained loosely in position into the pipe by aluminum foil spacers.

In this way, sample n° 1 was located at the bottom of the pipes and sample n° 9 close to the top. After placing the samples, the top of the pipes was closed with stoppers too and six 2 mm holes drilled in the pipe walls close to upper end.

When the pipes were immersed in the sea, air escaped from the upper holes letting seawater in filling the pipe. This setup was intended to simulate the situation when seawater enters the annulus of a flexible pipe, for example because of outer sheath leakages or break.

One of the pipes was recovered after 3 months immersion and the second pipe after 8 months immersion.

For reference, six identical wire samples were fixed to an open frame and immersed at the same depth and location. These samples were freely exposed to continuously renewed seawater.

Three of the six samples were recovered after 3 months and three after 8 months.

After recovery all the samples observed were cleaned from corrosion products and weighed. From weight difference an average corrosion rate of the layer can be easily computed on the basis of aluminum density of 2.7 g/cm$^3$.

The results are reported in TABLE 5 below.

TABLE 5

| | After 3 months of sea immersion | | | | After 8 months of sea immersion | | | |
| --- | --- | --- | --- | --- | --- | --- | --- | --- |
| | test 9 samples from Pipe 1 | | reference 3 samples from the frame | | test 9 samples from Pipe 2 | | reference 3 samples from the frame | |
| Wire mark | Weight change [g] | Al Thickness change [μm] | Weight change [g] | Al Thickness change [μm] | Weight change [g] | Al Thickness change [μm] | Weight change [g] | Al Thickness change [μm] |
| 1 | −0.0156 | −2.3 | −0.0364 | −5.3 | −0.0123 | −1.8 | | |
| 2 | −0.0009 | −0.1 | −0.0493 | −7.2 | −0.0018 | −0.3 | | |
| 3 | −0.0005 | −0.1 | −0.0438 | −6.4 | −0.0124 | −1.8 | | |
| 4 | +0.0030 | 0.0 | | | −0.0034 | −0.5 | −0.0479 | −7.0 |
| 5 | +0.0014 | +0.2 | | | −0.0061 | −0.9 | −0.0681 | −9.9 |
| 6 | +0.0025 | +0.4 | | | −0.0177 | −2.6 | −0.0509 | −7.4 |
| 7 | −0.0098 | −1.4 | | | −0.0142 | −2.1 | | |
| 8 | +0.0041 | +0.6 | | | −0.0075 | −1.1 | | |
| 9 | −0.0134 | −2.0 | | | −0.0051 | −0.7 | | |
| Statistics | | | | | | | | |
| Average | | −0.5 | | −6.3 | | −1.3 | | −8.1 |
| Standard deviation | | 1.0 | | 0.8 | | 0.7 | | 1.3 |
| Al Corrosion rate [μm/year] | | −2.1 | | −25.1 | | −2.0 | | −12.1 |

In test conditions, the aluminum corrosion rate was surprisingly low, with thickness losses around 1 μm, that is close to the sensitivity limit for this type of measurement. Moreover, samples recovered from the pipe after 8 months immersion were clean, without visible corrosion products, without fouling and with negligible pitting indication.

In reference conditions, to the contrary, a significantly higher corrosion rate was detected, with thickness losses in the 6 to 8 μm range. Samples recovered from the frame showed relevant fouling, carbonate concretions and diffuse areas of corrosion easily detectable at low magnification, with mixed characteristics, from uniform to shallow pit corrosion.

As a conclusion, assuming a corrosion rate of −2 μm/year, a 40 μm layer would survive 20 years of sea exposure in test conditions with negligible pitting risk, while in reference conditions (corrosion rate of −25 μm/year) at least 500 μm would be required for the same life, with a consistent risk of pitting corrosion and consequent local damage.

The invention claimed is:

1. A submarine flexible pipe, comprising:
   a metal flexible carcass;
   an inner polymeric liner arranged in a radially outer position with respect to said metal flexible carcass;
   a protective polymeric outer sheath; and
   a mechanical armor structure arranged in a radially inner position with respect to said protective polymeric outer sheath, said mechanical armor structure being potentially exposed to water contact, said mechanical armor structure comprising a pressure resistant armor and a tensile armor arranged in a radially outer position with respect to said inner polymeric liner, wherein said mechanical armor structure comprises a plurality of carbon steel elongated elements, each of said carbon steel elongated elements being coated by an aluminum cladding exposed to a potential contact with water.

2. The submarine flexible pipe according to claim 1, wherein said mechanical armor structure comprises at least two overlapping tensile armor layers.

3. The submarine flexible pipe according to claim 2, wherein said carbon steel elongated elements of said at least two overlapping tensile armor layers are arranged according to long-pitch helical windings.

4. The submarine flexible pipe according to claim 2, wherein said at least two overlapping tensile armor layers have opposite winding directions with respect to a longitudinal axis of the submarine flexible pipe.

5. The submarine flexible pipe according to claim 2, comprising a first layer of plastic material interposed between said at least two overlapping tensile armor layers.

6. The submarine flexible pipe according to claim 2, comprising a second layer of plastic material interposed between a radially inner layer of said at least two overlapping tensile armor layers and said pressure resistant armor.

7. The submarine flexible pipe according to claim 1, wherein said aluminum cladding has a thickness not less than about 250 μm.

8. The submarine flexible pipe according to claim 1, wherein said aluminum cladding has a thickness of between about 250-900 µm.

9. The submarine flexible pipe according to claim 1, wherein said aluminum cladding is applied by any of the following processes: immersion in melted aluminum, coating with aluminum thin foil, flame and/or plasma spraying, and aluminum extrusion.

10. The submarine flexible pipe according to claim 1, wherein said aluminum cladding is applied by an extrusion process.

11. The submarine flexible pipe according to claim 1, wherein said aluminum cladding comprises an aluminum alloy.

12. The submarine flexible pipe according to claim 1, wherein said metal flexible carcass comprises a helical winding of a stainless steel interlocked elongated element.

13. The submarine flexible pipe according to claim 1, wherein said inner polymeric liner comprises polyamide or polyvinylidene fluoride.

14. The submarine flexible pipe according to claim 1, wherein said at least one pressure resistant armor comprises a helical winding of an interlocked carbon steel elongated element.

15. The submarine flexible pipe according to claim 1, wherein said protective polymeric outer sheath comprises polyethylene or polyamide.

* * * * *